United States Patent
Kim et al.

(10) Patent No.: US 7,426,172 B2
(45) Date of Patent: *Sep. 16, 2008

(54) OPTICAL MODULE AND OPTICAL PICKUP INCLUDING THE SAME

(75) Inventors: Bong-gi Kim, Gyeonggi-do (KR); Soo-han Park, Gyeonggi-do (KR); Hyo-chan Lee, Seoul (KR); Jong-uk Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 690 days.

This patent is subject to a terminal disclaimer.

(21) Appl. No.: 10/834,998

(22) Filed: Apr. 30, 2004

(65) Prior Publication Data
US 2004/0218502 A1 Nov. 4, 2004

(30) Foreign Application Priority Data
Apr. 30, 2003 (KR) .................. 10-2003-0027539

(51) Int. Cl.
*G11B 7/135* (2006.01)
*G11B 7/09* (2006.01)

(52) U.S. Cl. .................. 369/112.28; 369/44.41
(58) Field of Classification Search .................. 372/92; 369/44.23, 44.41, 112.07, 112.1, 112.11, 369/112.15, 112.28, 121–122
See application file for complete search history.

(56) References Cited

U.S. PATENT DOCUMENTS

| | | | | |
|---|---|---|---|---|
| 4,750,162 A | * | 6/1988 | Tajima | 369/44.26 |
| 5,673,241 A | * | 9/1997 | Koyama et al. | 369/44.23 |
| 5,856,961 A | * | 1/1999 | Brazas et al. | 369/44.23 |
| 6,195,315 B1 | * | 2/2001 | Takahashi et al. | 369/44.23 |
| 6,266,314 B1 | * | 7/2001 | Fukakusa et al. | 369/112.01 |
| 6,507,544 B1 | * | 1/2003 | Ma et al. | 369/44.41 |
| 2002/0024916 A1 | | 2/2002 | Ueyama et al. | |
| 2005/0030878 A1 | * | 2/2005 | Park et al. | 369/112.08 |
| 2005/0063263 A1 | * | 3/2005 | Park et al. | 369/44.37 |
| 2005/0094541 A1 | * | 5/2005 | Kim et al. | 369/121 |
| 2005/0117500 A1 | * | 6/2005 | Kim et al. | 369/121 |

FOREIGN PATENT DOCUMENTS

| | | |
|---|---|---|
| CN | 1184309 A | 6/1998 |
| CN | 1277711 A | 12/2000 |

(Continued)

*Primary Examiner*—Joseph Feild
*Assistant Examiner*—Nathan Danielsen
(74) *Attorney, Agent, or Firm*—Staas & Halsey LLP

(57) ABSTRACT

An optical pickup includes an optical module that detects an information signal and/or an error signal by radiating light to a recording medium and receives light reflected by the recording medium. The optical module includes a light source; an optical path changer that changes a path of light emitted from the light source; a main photodetector that receives light that is reflected off a recording medium back to the optical module to detect an information signal and/or an error signal; and a hologram element that generates an astigmatism of the light incident onto the optical module. Since most optical elements of the optical pickup except an objective lens are packaged in the optical module, the entire structure of the optical pickup can be simplified and the number of bonding points for fixing the optical elements of the optical pickup on a base can be reduced.

30 Claims, 6 Drawing Sheets

FOREIGN PATENT DOCUMENTS

| | | |
|---|---|---|
| JP | 11213424 | 8/1999 |
| JP | 2000-11443 | 1/2000 |
| JP | 2000228022 | 8/2000 |
| JP | 2000-353332 | 12/2000 |
| JP | 200292933 | 1/2002 |
| JP | 2002237080 | 8/2002 |
| KR | 2002-45364 | 6/2002 |

\* cited by examiner 29a  29b

+1st   0th   −1st

OPTICAL MODULE AND OPTICAL PICKUP INCLUDING THE SAME

CROSS-REFERENCE TO RELATED APPLICATION

This application claims the benefit of Korean Patent Application No. 2003-27539, filed on Apr. 30, 2003, in the Korean Intellectual Property Office, the disclosure of which is incorporated herein in its entirety by reference.

BACKGROUND OF THE INVENTION

1. Field of the Invention

The present invention relates to an optical module with a simple optical system structure and an optical pickup including the same.

2. Description of the Related Art

Optical pickups are used to record information on and/or reproduce information from recording media. Such optical pickups are composed of various optical devices that include a light source that emits a laser beam, an optical path changing device that changes the proceeding path of light emitted from a light source, an objective lens focusing the light emitted from the light source to form an optical spot on a recording surface of the recording medium, and a photodetector receiving light reflected from the recording surface of the recording medium to detect an information signal and/or an error signal.

FIG. 1 is a partial sectional perspective view of a semiconductor laser module used as a light source in an optical pickup. Referring to FIG. 1, a general semiconductor laser module includes a cap 3 having a glass window 5, through which a laser beam transmits, on a body 1. In addition, a mount 2 is disposed in the body 1, and a semiconductor laser 10 that emits a laser beam with a predetermined wavelength to both sides is installed on a side wall of the mount 2. Also, a monitoring photodetector 7 that receives a laser beam L2 emitted by the semiconductor laser 10 away from the glass window 5 is disposed in the body 1. The monitoring photodetector 7 monitors a laser beam L1 emitted by the light source 10 toward the glass window 5 based on the detected signal. The semiconductor laser 10 and the monitoring photodetector 7 are connected to a lead 9 used as a conductive path.

Referring to FIG. 2, the laser beam emitted from a predetermined position of the active layer 11 in the semiconductor laser 10 is divergent and has an elliptical cross section. Since sizes of emitting apertures through which the laser beams are emitted, in the thickness direction and the width direction crossing the thickness direction at a right angle of the active layer 11 are different from each other, the beams are diffracted differently from each other. Here, the laser beam propagating in the thickness direction (direction Y) is the same as that emitted from the front portion of the laser 10, and the laser beam in the width direction (direction X) is the same as that emitted from a point that is a distance $\Delta Z$ from a front portion of the semiconductor laser. In FIG. 2, $\theta_\parallel$ is a spread angle in the width direction, and $\theta_\perp$ is a spread angle in the thickness direction.

Astigmatism caused by structural characteristics of the above semiconductor laser module is not important, if the light is exactly focused on the optical disc.

However, if the light is not exactly focused on the optical disc due to a change of optical length in the optical system, the light is distorted in one direction. This causes degradation of recording and/or reproducing.

The astigmatism does not cause a problem when the optical system has perfect structure and the optical length of the optical system is stable at low or high temperatures. However, since optical elements constituting the optical pickup are adhered to a base using an ultraviolet (UV) bond and the optical pickup is operated at a high temperature when it performs recording and/or reproducing operations, the optical length of the optical system may change. The more optical elements constituting the optical pickup, the more variable the optical length of the optical system becomes. Therefore, the astigmatism in the semiconductor laser has a significant negative effect on the recording and/or reproducing performances of the optical pickup.

When the optical recording and/or reproducing device including the optical pickup is operated, a spindle motor that rotates the optical disc and various chips that process signals operates simultaneously. Because the elements generate heat when information is recorded on the optical disc or information recorded on the optical disc is read, an inner temperature of the optical pickup may rise to a high temperature.

For example, since the power of a laser beam in a recording operation of a digital versatile disc (DVD) is higher than that in a reproducing operation of the DVD, the optical pickup operates at a higher temperature when it performs the recording operation than during the reproducing operation. In the recording operation, the heat is generated by a chip used to process signals and the semiconductor laser module used as the light source, thus increasing the inner temperature of the optical recording and/or reproducing device to about 70° C. Even if the optical recording and/or reproducing device for the DVD includes a cooling system such as a fan, the inner temperature rises higher than 60° C., because the optical recording/reproducing device for the DVD includes a chip generating large amounts of heat, for example, a chip for servo. Also, in the reproducing operation, the inner temperature may rise to about 45° C.

Therefore, the optical pickup always operates at a high temperature when the optical recording and/or reproducing device is operated. In a hot external environment or summer season, the temperature environment for using the optical pickup become worse.

Operation at high temperatures may cause a distortion of the optical system length and the optical elements. That is, to adhere the optical elements to the base, a UV bond is generally used. However, the part adhered by the bond may be distorted or expanded at the high temperature. Thus, the optical elements may be distorted and thus the optical path may be slightly changed.

As described above, when the optical paths of the optical elements are changed, loss of light greatly increases and thus the amount of light propagated to the recording medium (not shown) is reduced. Consequently, signal reduction or non-operation of the optical pickup may occur when the light reflected from the recording medium is not received on the photodetector (not shown), and/or otherwise deviates from the photodetector.

Therefore, in the high temperature operation, the signal recording and/or reproducing ability of the optical pickup gets worse. Also, in the high temperature operation, the large number of optical elements constituting the optical pickup increase the possibility of non-operation of the optical pickup. Additionally, the large number of the optical elements constituting the optical pickup increase manufacturing costs of the optical pickup.

When the optical element is adhered to the base, tolerance is a design factor that must be considered. For example, when numerous optical elements are used as the recording optical pickup, even if the optical elements have low tolerance, the entire optical pickup has a larger tolerance. In more detail, positions of the optical elements are decided according to focal lengths of the lens and optical length design. Here, even though a sample or a product is fabricated according to a design, since the tolerance of the design and the fabrication tolerance of each optical element always exists, the sample or the product may not be exactly the same as the design. Moreover, when the optical elements are assembled on the base such that the tolerances of the base and the optical elements are added together, the overall tolerance increases.

Generally, the light that passes through a collimating lens, which is used to change the diverging laser beam emitted from the semiconductor laser used as the light source in an optical pickup into parallel light, may converge or diverge due to a difference of the optical path caused by the above assembling error.

Since aberration is large at an edge of a lens in comparison with the center of the lens, the optical system of the optical pickup includes an objective lens which has minimal spherical aberration when parallel light enters and a collimating lens. However, when light incident on the objective lens is convergent or divergent due to an assembling error, the aberration increases and the light focused on the recording medium has an asymmetric shape. When the asymmetric light is focused on the recording medium, the light received by the photodetector becomes asymmetric and thus jitter increases. Also, since the focal point of the light is not exactly positioned on the photodetector, signal sensitivity is lowered.

Therefore, points where optical elements are adhered by the UV bond should be reduced considering the structural characteristics of the semiconductor laser causing astigmatism, operation of the optical pickup at high temperature, manufacturing costs and assembling errors of the optical pickup.

SUMMARY OF THE INVENTION

According to an aspect of the present invention, an optical module with a reduced number of bonding points, which are bonded by ultraviolet (UV) bonds, thus ensuring reliability of operation at high temperature and thus ensuring reliance of high temperature operation, and an optical pickup including the optical module is provided.

According to an aspect of the present invention, there is provided an optical module used in an optical pickup so as to emit light onto a recording medium and receive the light reflected from the recording medium to detect an information signal and/or an error signal, the optical module including: a light source; an optical path changer that changes a path of light emitted from the light source; a main photodetector that receives light that is reflected off a recording medium back to the optical module to detect an information signal and/or an error signal; and a hologram element that generates an astigmatism of the light incident onto the optical module.

According to another aspect of the present invention, there is provided an optical pickup including: an optical module comprising a light source, an optical path changer that changes a path of light emitted from the light source, a main photodetector that receives light that is reflected off a recording medium back to the optical module to detect an information signal and/or an error signal, and a hologram element that generates astigmatism of the light incident onto the optical module; and an objective lens that focuses the light emitted from the optical module to an optical spot on a recording surface of the recording medium.

In an aspect of the present invention, the hologram element includes at least two division surfaces, and a predetermined hologram pattern so that the at least one division surface generates positive astigmatism and the other division surface generates negative astigmatism.

In an aspect of the present invention, main photodetector includes: a first light receiving portion divided into at least two parts in a direction corresponding to a radial direction of the recording medium; a second light receiving portion including six sections arranged in a 2×3 matrix structure; and a third light receiving portion divided into at least two parts in a direction corresponding to the radial direction of the recording medium.

In an aspect of the present invention, when the first light receiving portion detects a first light receiving signal and a second light receiving signal in the direction corresponding to the radial direction of the recording medium, an information signal is obtained by adding the first and second light receiving signals, and a relative tilt signal of the objective lens with respect to the recording medium is obtained by subtraction between the first and second light receiving signals.

In an aspect of the present invention, when the six sections of the second light receiving portion arranged in the 2×3 matrix structure are A1, A2, A3, B1, B2, and B3, a focus error signal is a difference between signals detected by the sections A2 and B2.

In an aspect of the present invention, when the six sections of the second light receiving portion arranged in the 2×3 matrix structure are A1, A2, A3, B1, B2 and B3, and the third light receiving portion detects a first light receiving signal and a second light receiving signal in a direction corresponding to the radial direction of the recording medium, a tracking error signal is obtainable by subtracting a sum of signals detected by A1, A2, and A3 and a sum of signals detected by B1, B2, and B3 and the difference between the first and second light receiving signals.

In an aspect of the present invention, optical path changer includes a polarization beam splitter that transmits or reflects incident light according to a polarization component of the light, and a quarter wave plate that changes the polarization of the incident light.

In an aspect of the present invention, the hologram element and the quarter wave plate is coupled to the polarization beam splitter.

In an aspect of the present invention, the light source is a semiconductor laser that emits light in one or more wavelength regions including an infrared ray wavelength suitable for a compact disc, a red wavelength suitable for a digital versatile disc, and a blue wavelength suitable for a next-generation digital versatile disc that is able to store moving picture information of high definition.

In an aspect of the present invention, the optical pickup includes a monitoring photodetector that monitors light output emitted by the light source.

In an aspect of the present invention, the optical pickup includes a beam shaping window that shapes the laser beam emitted from the light source.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
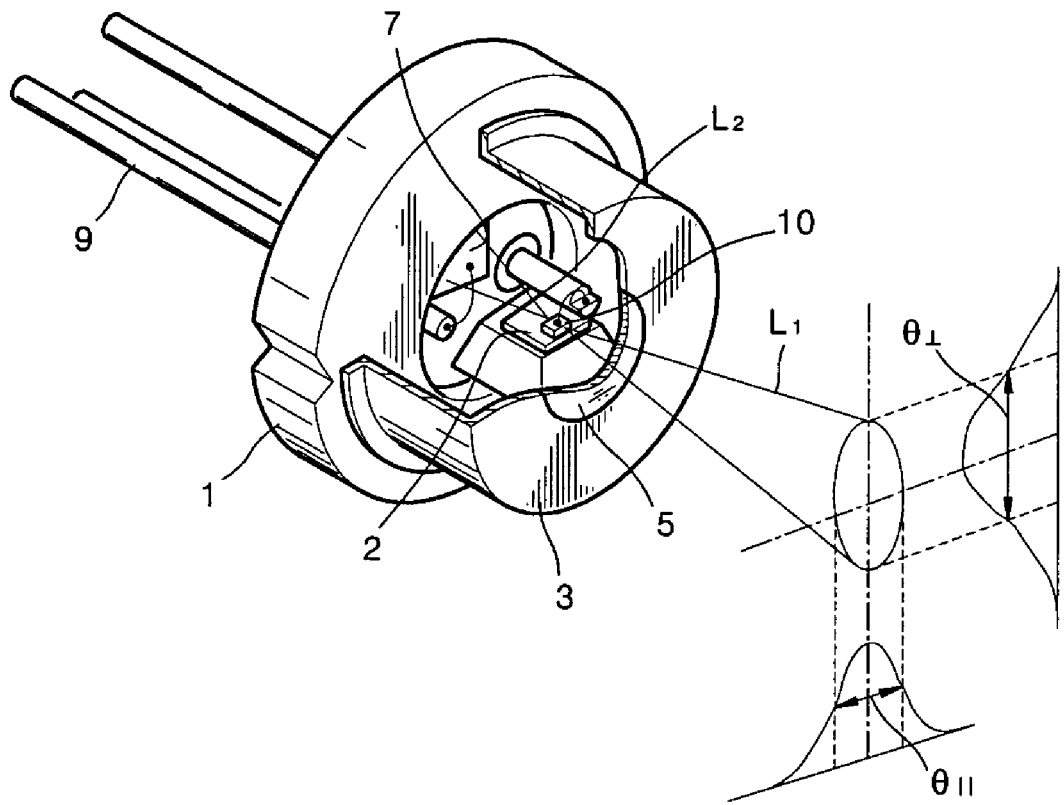
FIG. 1 is a partial-sectional perspective view illustrating a conventional semiconductor laser module.
Figure 2:
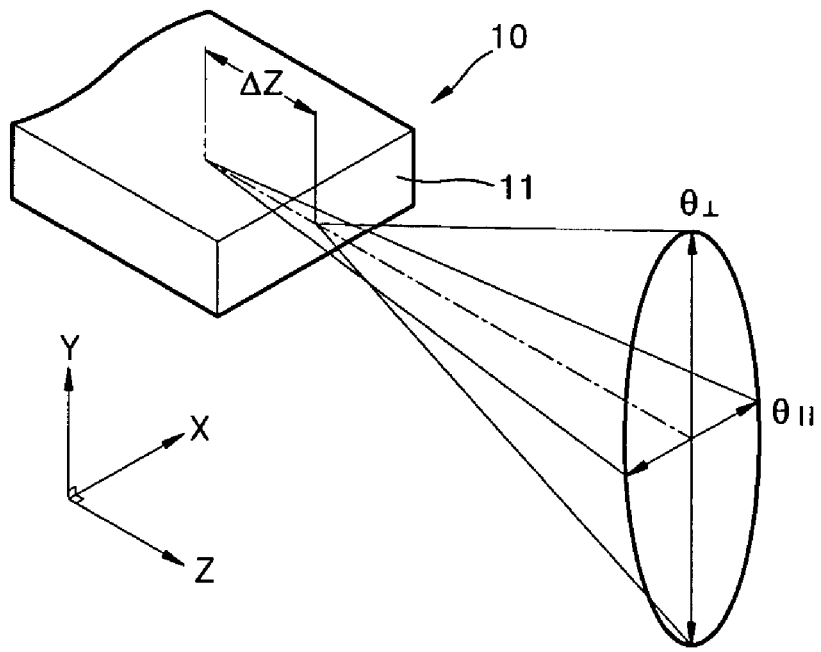
FIG. 2 is a view illustrating the light beam emitted from a conventional semiconductor laser.

Reference will now be made in detail to the embodiments of the present invention, examples of which are illustrated in the accompanying drawings, wherein like reference numerals refer to the like elements throughout. The embodiments are described below to explain the present invention by referring to the figures.

An optical module according to an aspect of the present invention can be used in an optical pickup to emit light onto a recording medium, and to receive light reflected from the recording medium to detect information signals and/or error signals, and is a single package including most optical elements constituting the optical pickup except an objective lens.

Figure 3:
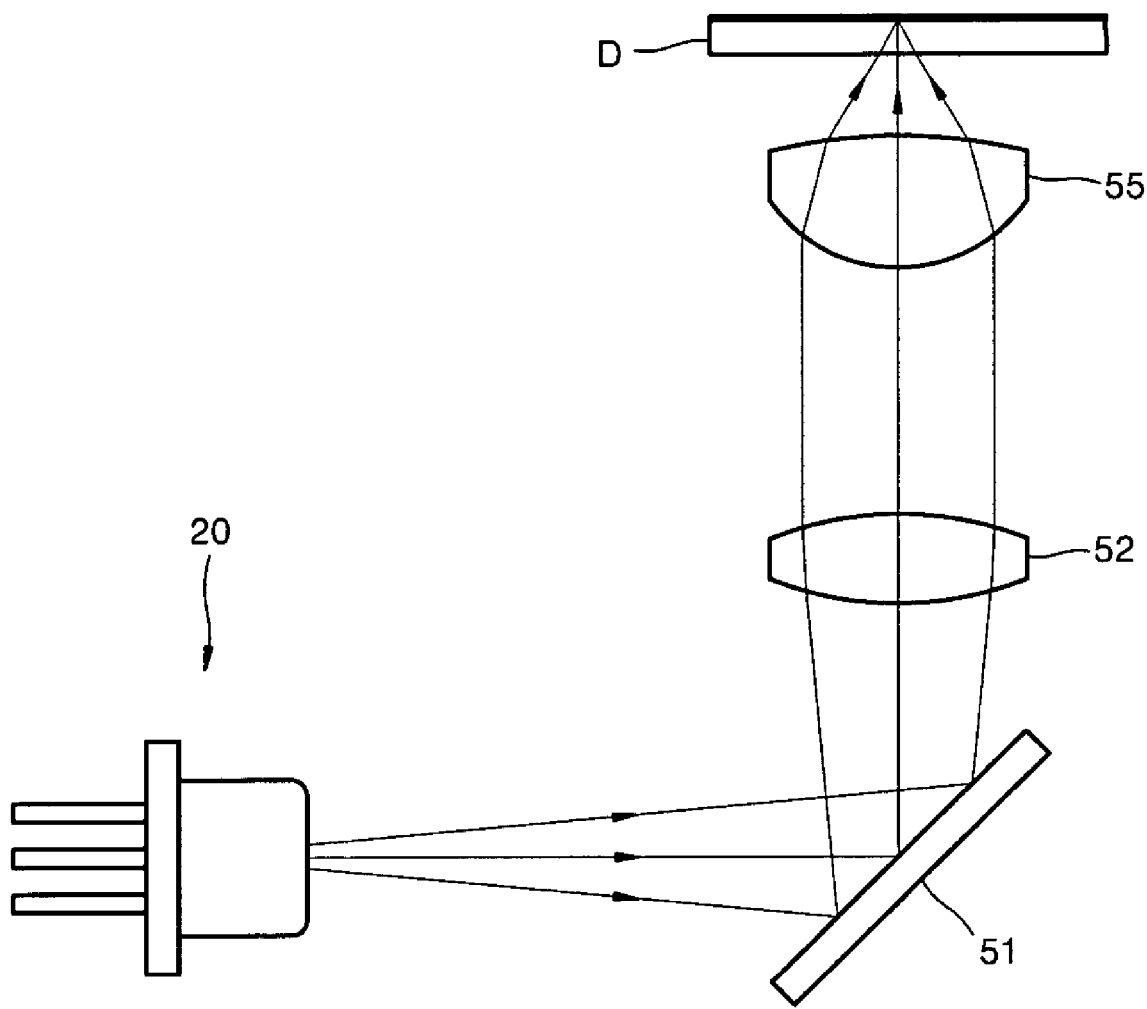
FIG. 3 is schematic diagram of an optical pickup including an optical module according to an embodiment of the present invention.
Figure 4:
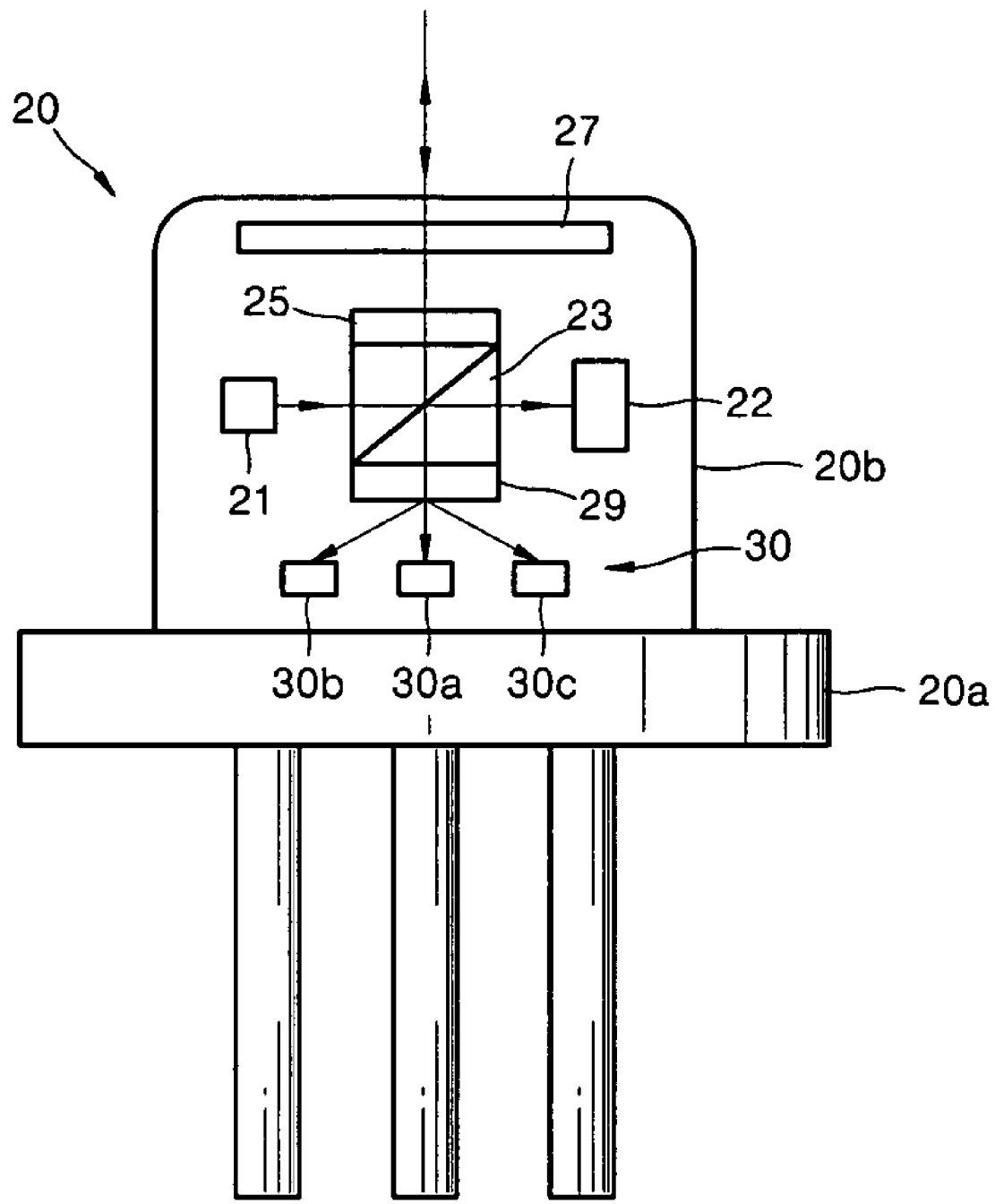
FIG. 4 is a schematic view illustrating an optical module according to an embodiment of the present invention.

FIG. 3 is a schematic diagram of an optical pickup including an optical module 20 according to an embodiment of the present invention, and FIG. 4 is a schematic diagram of an optical module 20 according to an embodiment of the present invention.

Referring to FIGS. 3 and 4, the optical pickup according to an aspect of the present invention includes the optical module 20, and an objective lens 55 that focuses light emitted by the optical module 20 onto a spot on a recording surface of an optical disc D. Also, while not required in all aspects, the optical pickup also includes a collimating lens 52 that changes diverging light emitted from the optical module 20 into parallel light.

In FIG. 3, the light emitted from the optical module 20 is reflected by a reflecting mirror member 51 toward the objective lens 55 in the optical pickup. Also in FIG. 3, the collimating lens 52 is disposed between the reflecting mirror member 51 and the objective lens 55, but may be disposed between the optical module 20 and the reflecting mirror member 51, or in the optical module 20.

Referring to FIG. 4, the optical module 20 includes a light source 21, an optical path changer that changes the path of the light emitted from the light source 21, a main photodetector 30 that receives the light after being reflected by the optical disc D and reentering the optical module 20 to detect an information signal and/or an error signal, and a hologram element 29 generating astigmatism to the reentering light. While not required in all aspects, the optical module 20 further includes a monitoring photodetector 22 that monitors an amount of light output from the light source 21. Also, the optical module 20 includes a body 20a and a cap 20b, on which the optical elements are disposed.

The cap 20b protects the optical elements (that is, the light source 21, the main photodetector 30, and the monitoring photodetector 22) from external affects, and includes a glass window 27 (a beam shaping window 27 in FIG. 9) through which the light passes.

The light source 21 is a semiconductor laser that emits the infrared light suitable for a compact disc (CD), that is, 780 nm light, the red light suitable for a DVD, that is, 650 nm light, or the blue light suitable for a next generation DVD (such as Bluray discs and Advanced Optical Discs) that is able to store moving picture information of high definition quality, that is, 405 nm light. Also, when the optical pickup can adapt to various kinds of optical discs with different formats, a twin-laser diode (LD) emitting lights of two different wavelengths among the above three different wavelengths or a three-wavelength semiconductor laser emitting lights of three different wavelengths, can be used as the light source 21. Here, the twin LD consists of two semiconductor lasers that emit laser lights with different wavelengths. However, it is understood that other types of light sources can be used beyond semiconductor lasers.

The optical path changer changes the optical path of the light so that most of the light emitted from the light source 21 exits through the window 27 of the optical module 20, and the light entering the optical module 20 through the window 27 is directed toward the main photodetector 30. The shown optical path changer includes a polarization beam splitter 23 and a quarter wave plate 25. However, it is understood that other types of optical path changers can be used.

The polarization beam splitter 23 reflects the light of one linear polarization component, and transmits the light of the other linear polarization component. The light of the one linear polarization component is reflected by the polarization beam splitter 23 and emitted from the optical module 20. The light of the other linear polarization component emitted from the light source 21 transmits through the polarization beam splitter 23, and is received by the monitoring photodetector 22.

The quarter wave plate 25 changes the polarization of incident light. The one linearly polarized light that passes through the polarization beam splitter 23 becomes one circularly polarized light while passing through the quarter wave plate 25. The one circularly polarized light becomes another circularly polarized light while it is irradiated to the optical disc D and reflected by the optical disc D, and reenters the optical module 20. The other circularly polarized light that reenters the optical module 20 is changed to the other linearly polarized light while it passes through the quarter wave plate 25, and is received by the main photodetector 30 after transmitting through the polarization beam splitter 23.

The hologram element 29 generates astigmatism to light proceeding toward the main photodetector 30 after being reflected by the optical disc D. The hologram element 29 may be disposed between the polarization beam splitter 23 and the main photodetector 30 as shown, or between the polarization beam splitter 23 and the window 27 of the optical module 20 (not shown). In FIG. 4, the hologram element 29 is disposed between the polarization beam splitter 23 and the main photodetector 30.

When the hologram element 29 is disposed between the optical path changer and the main photodetector 30 as shown in FIG. 4, the hologram element 29 may be formed to generate astigmatism to the incident light regardless of the polarized state of the light or may be formed to generate astigmatism only to the light having specific polarization states that can proceed to the main photodetector 30 through the polarization beam splitter 23.

When the hologram element 29 is disposed between the optical path changer and the main photodetector 30, a beam splitter that transmits and reflects incident light in a predetermined ratio is used as the optical path changer according to an aspect of the invention.

Also, when the hologram element 29 is disposed between the polarization beam splitter 23 and the window 27 of the optical module, it is desirable that the hologram element 29 is formed to generate astigmatism to the light having a specific polarization state, which can pass through the polarization beam splitter 23 and proceed to the main photodetector 30.

In an aspect of the present invention, it is desirable, though not required, that the hologram element 29 and the quarter wave plate 25 are integrally coupled with the polarization beam splitter 23.

Figure 5:
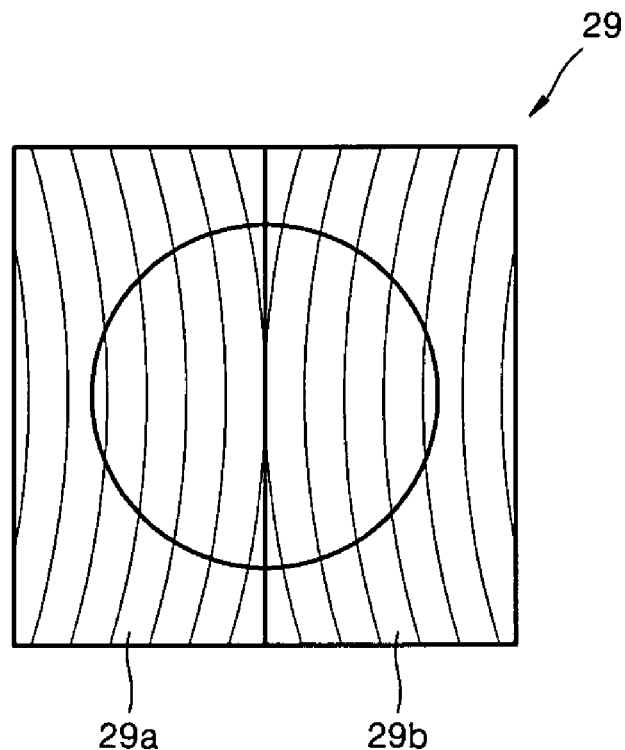
FIG. 5 is a schematic view of a hologram element of FIG. 4.

Referring to FIG. 5, the hologram element 29 includes at least two division surfaces 29a and 29b. The hologram pattern is formed so that the first division surface 29a generates positive astigmatism, and the second division surface 29b generates negative astigmatism. Also, the first and second division surfaces 29a and 29b include hologram patterns, which are arranged in different directions, so that the primarily diffracted light of semicircular shape can diverge from each other.

Here, positive astigmatism means that the focal point is located in front of the original focal point, and negative astigmatism means that the focal point is located behind the original focal point.

Figure 6:
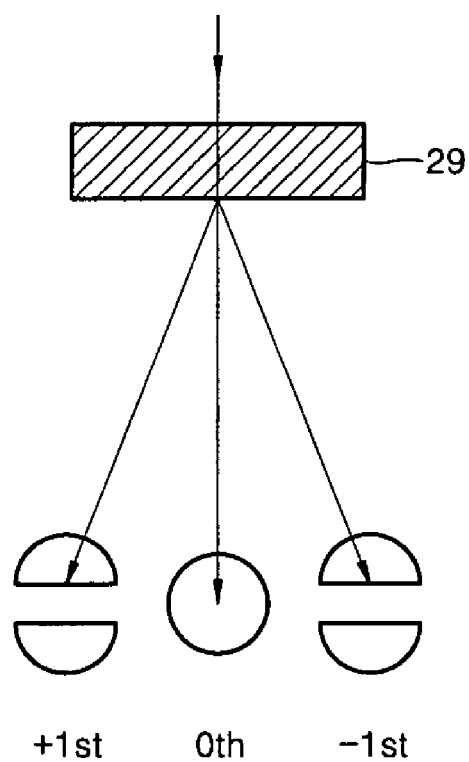
FIG. 6 is a schematic view illustrating diffraction characteristics of light reflected from an optical disc by the hologram element in FIG. 5.

Therefore, as shown in FIG. 6, the light reflected by the optical disc D is diffracted into a 0th order, a +1st-order and a −1st-order by the hologram element 29 the light beams of semicircular shape diffracted 1st order (that is, +1st order and −1st order) by the two division surfaces 29a and 29b are split from each other as the $1^{st}$ order light beams proceeds toward the main photodetector 30. Also, as the objective lens 55 moves in up-and-down direction, the astigmatism generated by the first and second division surfaces 29a and 29b is changed. Therefore, when one of the semicircles of the diffracted light becomes larger, the other becomes smaller.

Since the positive astigmatism and the negative astigmatism generated by the first and second division surfaces 29a and 29b of the hologram element 29 are detected by subtraction operation through the main photodetector 30, the focusing operation of the objective lens 55 may be performed.

Figure 7:
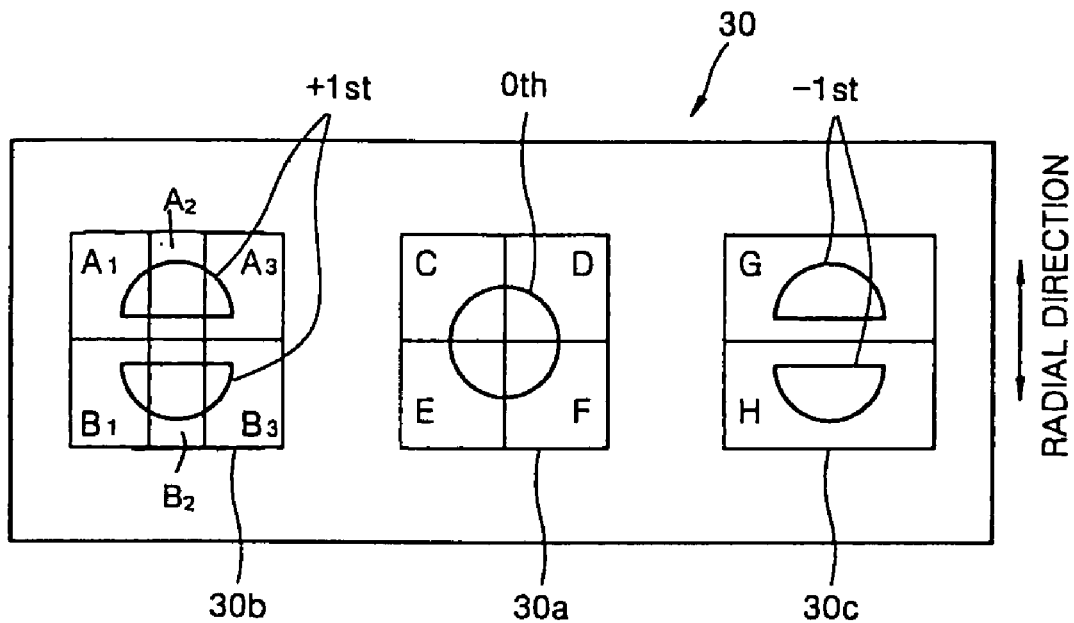
FIG. 7 is a schematic view illustrating a dividing structure of a main photodetector of FIG. 4.

The main photodetector 30 receives the light reflected by the recording surface of the optical disc D, reentering the optical module 20 and passing through the optical path changer and detects the information signal and/or the error signal. The main photodetector 30 includes first through third light receiving portions 31a, 30b and 30c, respectively, as shown in FIG. 7.

The first light receiving portion 30a detects the information signal reproduced from the optical disc D, as recognized from equation 1 below, and is used to detect a tilt signal when information is recorded on and/or reproduced from the optical disc D. The first light receiving portion 30a is divided into at least two sections. For example, the first light receiving portion 30a includes four sections C, D, E, and F arranged in a 2×2 matrix as shown in FIG. 7, and the sections C, D, E, and F independently perform photoelectric transformation.

The second light receiving portion 30b detects a focus error signal and a tracking error signal when information is recorded to and/or reproduced from the optical disc D, as recognized from equation 1. The second light receiving portion 30b includes six sections A1, A2, A3, B1, B2, and B3, arranged in a 2×3 matrix, which independently perform photoelectric transformation.

The third light receiving portion 30c along with the second light receiving portion 30b detects the tracking error signal when information is recorded to and/or reproduced from the optical disc D, as recognized from equation 1. The third light receiving portion 30c is divided into at least two sections in the radial direction. For example, the third light receiving portion 30c includes two sections G and H arranged in 2×1 matrix, and the sections G and H independently perform the photoelectric transformation.

The focus error signal (FES), the tracking error signal (TES), the tilt signal (Tilt) and the information signal (RF) can be detected using the detection signals of the first through third light receiving portions 30a, 30b, and 30c with equation 1. In equation 1 and equation 2, which will be described later, each section of the first through third light receiving portions 30a, 30b, and 30c and the detection signal of each section is denoted by the same reference characters.

$$FES = A_2 - B_2 \qquad (1)$$

$$TES = (G - H) - ((A_1 + A_2 + A_3) - (B_1 + B_2 + B_3))$$

$$Tilt = (C + D) - (F + E)$$

$$RF = (C + D + F + E)$$

As shown in equation 1, the focus error signal (FES) is a difference signal between the signals detected by the section A2 and the section B2 of the second light receiving portion 30b. The focus error signal (FES) is detected using principles of a beam spot size detection method.

It is assumed that the signals detected by the third light receiving portion 30c having at least a two-division structure are first and second light receiving signals in the radial direction (as shown in FIG. 7, when the third light receiving portion 30c is divided into two sections, the first light receiving signal is detected by the section G and the second light receiving signal is detected by the section H).

The tracking error signal (TES) is calculated by subtracting a difference signal representing a difference between a sum of the signals of sections A1, A2, and A3 and a sum of the signals of the sections B1, B2, and B3 from a difference signal representing a difference between the first and second light receiving signals.

Also, assuming that the detection signals of the first light receiving portion 30a are third and fourth light receiving signals in the radial direction (as shown in FIG. 7, when the first light receiving portion 30a includes the four sections C, D, E, and F arranged in a 2×2 matrix structure, the third light receiving signal is equal to a sum of the signals detected by the sections C and D, and the fourth light receiving signal is equal to a sum of the signals detected by the sections E and F), the information signal is determined by adding the third and fourth light receiving signals, and the tilt signal representing relative tilt of the objective lens 55 with respect to the optical disc D is a difference signal representing a difference between the third and fourth light receiving signals.

It is understood that the main photodetector 30 may have a different structure besides the above described 12-division structure.

The tilt signal (Tilt) can be detected using the divided structures of the hologram element 29 and the main photodetector 30, as shown in equation 1. The relative tilt of the objective lens 55 with respect to the optical disc D can be controlled using the tilt signal (Tilt) to compensate for tilt effects of the objective lens 55.

The light received by the first through third light receiving portions 30a, 30b, and 30c includes a DC component with respect to light reflected by the optical disc D and an AC component caused by diffraction by a pit or a mark formed on the optical disc D.

Figure 8:
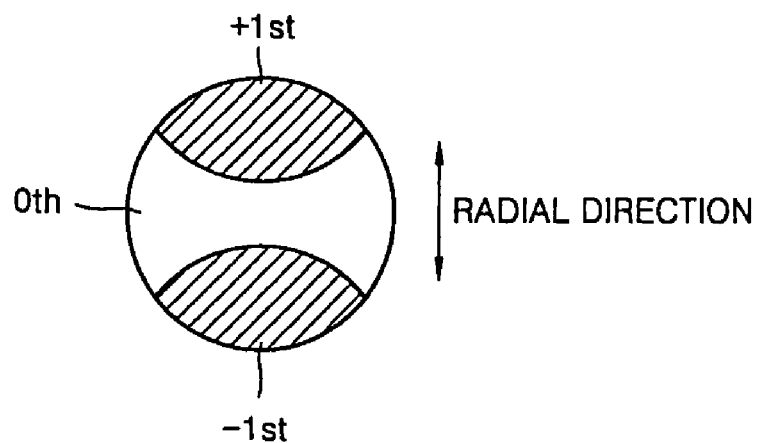
FIG. 8 is a view illustrating an overlap structure of light reflected from an optical disc due to diffraction of the light by a pit or mark.

As is well-known in the art, the light reflected from the optical disc D is diffracted with a 0th order or ±1st order due to diffraction by a pit or a mark on the optical disc D. Therefore, as shown in FIG. 8, a cross section of the laser beam proceeding toward the optical module 20 after passing through the objective lens 55 has a structure in which the 0th order diffracted light partially overlaps with a ±1st order diffracted light. The laser beam with the overlapped structure is diffracted into the 0th order and the ±1st order by the hologram element 29 and received by the first through third light receiving portions 30a, 30b, and 30c as shown in FIG. 7. The overlapped structure of the beam is not shown in FIG. 7.

Therefore, a shift signal of the objective lens 55 can be detected using the detection signals of the first and third light receiving portions 30a and 30c with the following equation 2.

$$\text{Shift}=((C+D)-(F+E))-k(G-H) \tag{2}$$

Here, k is a gain control value.

As seen from equation 2, by the operation of the detection signals of the first and third light receiving portions 30a and 30c, the AC component is removed and a DC component corresponding to the shifting amount of the objective lens 55 remains.

In more detail, the (C+D)−(F+E) part, in which the detection signals of the first light receiving portion 30a are operated, and the G−H part, in which the detection signals of the third light receiving portion 30c are operated, include the DC component of the light reflected from the optical disc D and the AC component caused by the diffraction due to the pit or the mark formed on the optical disc D. If the objective lens 55 does not shift, the DC component and the AC component in the (C+D)−(F+E) part and the G−H part exist in the same ratio, and thus the shift signal is always 0 by properly using the gain control k (light amount ratio). However, when the objective lens 55 is shifted by eccentricity of the optical disc D, the AC component does not change, but the DC component is changed on the light focused on the photodetector based on the center portion of the photodetector 30.

However, the AC component is removed and only the DC component remains when using equation 2. Therefore, since the shift signal obtained using equation 2 is the DC component corresponding to the amount by which the objective lens 55 shifts, when a servo signal and/or a reproducing signal is compensated using the shift signal, the effect of the shift of the objective lens 55 is removed. Accordingly, the mis-operation of the objective lens 55 is compensated for and degradation of signal recording and/or reproducing capability can be prevented.

As seen from equation 2, the shift signal can be detected using the hologram element 29 and the divided structures of the main photodetector 30, and the shift effect of the objective lens 55 can be compensated for by controlling the radial position of the objective lens 55 using the shift signal.

The monitoring photodetector 22 receives some of the light emitted from the light source 21 to monitor the output of the light source 21 so that the output of the light source 21 can be controlled precisely by an auto power controller (APC) circuit disposed between the monitoring photodetector 22 and the light source 21.

When the optical module 20 is used, most optical elements except the objective lens 55 can be packaged in the optical module 20. Thus, the structure of the optical pickup can be simplified, and the number of bonding points that fix the optical elements of the optical pickup on the base can be reduced, thereby improving reproducing and/or recording capability of the optical pickup when the optical pickup is operated at high temperatures.

On the other hand, the objective lens 55 focuses the light emitted from the optical module 20 to make a spot on the recording surface of the optical disc D. The objective lens 55 is driven by an actuator (not shown) in a focusing direction, a tracking direction and a tilt direction based on the error signal detected by the main photodetector 30.

Figure 9:
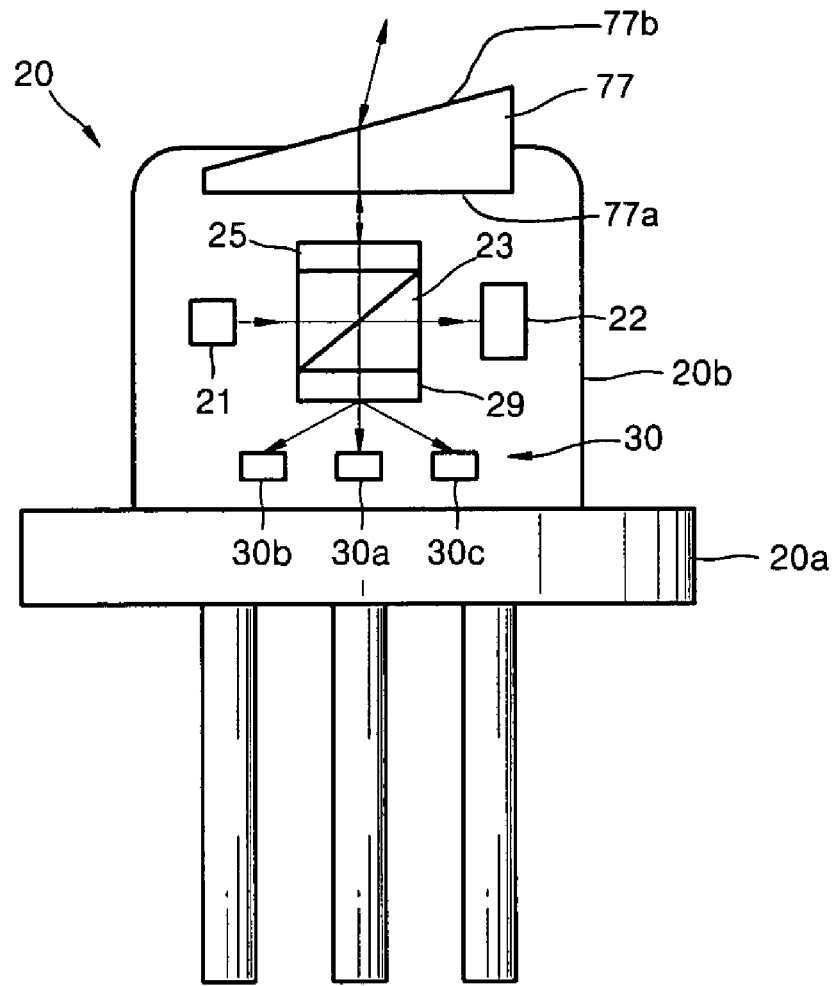
FIG. 9 is a schematic view illustrating an optical module according to another embodiment of the present invention.

According to an embodiment of the invention, the optical module 20 includes a beam shaping window 77, as shown in FIG. 9, instead of the plate type window 27 shown in FIG. 4 in order to shape the laser beam emitted from the semiconductor laser, which is used as the light source 21.

The beam shaping window 77 is installed in an area of the cap 20b that corresponds to the path of the laser beam. The beam shaping window 77 shapes the transmitting laser beam. The beam shaping window 77 includes a first surface 77a, onto which the laser beam is incident, and a second surface 77b, from which the laser beam exits.

The first surface 77a is perpendicular to the proceeding direction of the light emitted from the light source 21 such that the incident light almost transmits directly through the first surface and continues in the same direction. The second surface 77b is inclined at a predetermined angle to the optical axis of the proceeding light passing through the first surface 77a, thereby refracting the incident light.

The shape of the laser beam that exits from the optical module 20 can be formed into a desired shape using the beam shaping window 77. Principles of shaping the beam will now be described with reference to FIG. 10.

Figure 10:
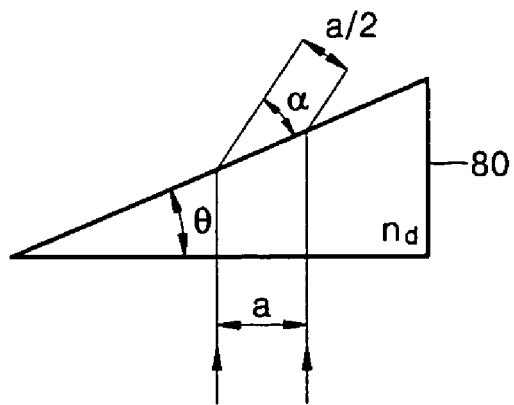
FIG. 10 is a schematic view illustrating beam shaping principles of a beam shaping window of FIG. 9.

Referring to FIG. 10, a beam shaping prism 80 corresponding to the beam shaping window 77 in FIG. 9 is a transparent member having a refraction index $n_d$, and a sloped surface thereof is slanted at an angle $\theta$ to a bottom surface. The laser beam perpendicularly incident onto the bottom surface of the beam shaping prism 80 exits from the slope surface with an angle $\alpha$ to the slope surface.

In this arrangement, when the diameter of the cross section at the incident beam is a and the diameter of the exit beam is desired to be $$\frac{a}{2},$$

the angles $\theta$ and $\alpha$ are given by the following equations.

The angles $\theta$ and $\alpha$ can be obtained by calculating equation 3 according to Snell's law, and using equation 4.

$$\sin(90-\alpha)=n_d\sin\theta \tag{3}$$

$$2\sin\alpha=\cos\theta \tag{4}$$

Equation 4 is obtained from the relationship between the diameter of the cross section of the incident beam and the diameter of the cross section of the exiting beam.

For example, when the beam shaping prism 80 is made of a material having a refraction index $n_d$ 1.514362, the angle $\theta$ is 37.29° and the angle $\alpha$ is 23.44°, as calculated in equations 3 and 4.

On the other hand, the above description is for changing the shape of the beam incident onto the beam shaping prism 80 in the vertical direction ($\theta_\perp$ direction in FIG. 1), without changing the diameter of the beam in the horizontal direction ($\theta_\parallel$ direction in FIG. 1). Therefore, when a laser beam having an oval cross section is incident upon the beam shaping prism 80, an exiting beam with a circular cross section can be formed, and the size of the exiting laser beam can be changed.

When the optical module 20 including the beam shaping window 77 such as the beam shaping prism 80 is included in the optical pickup, the optical module 20 is disposed considering that the optical path is bent due to the refraction of light in the beam shaping window 77.

The beam shaping window 77 can be disposed so that the first surface 77a, on which the laser beam is incident from the light source 21, is the slope surface. In this case, the optical elements are disposed to correspond to this arrangement. As described above, when the oval beam emitted from the light source 21 is shaped into the circular beam using the beam shaping window 77 of the optical module 20, the optical recording and/or reproducing characteristics can be improved.

According to the present invention, since most of the optical elements except the objective lens are packaged in a single optical module, the structure of the optical pickup can be simplified, and the number of bonding points that fix the optical elements of the optical pickup on the base can be reduced. Thus, reliability of the optical pickup can be ensured when it is operated at a high temperature.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical module used in an optical pickup so as to emit light onto a recording medium and receive the light reflected from the recording medium to detect an information signal and/or an error signal, the optical module comprising:
 a body and optical elements disposed in the body, the optical elements comprising:
  a light source;
  an optical path changer that changes a path of light emitted from the light source;
  a main photodetector that receives light that is reflected off the recording medium back to the optical module to detect the information signal and/or the error signal;
  a hologram element that generates an astigmatism of the light incident onto the optical module; and
  a beam shaping window disposed at the body that shapes the laser beam emitted from the light source,
  wherein the beam shaping window is a prism having a first surface disposed perpendicular to the emitted light and a second surface inclined at an angle to an optical axis of the emitted light such that the emitted light is refracted.

2. The optical module of claim 1, wherein the hologram element includes at least two division surfaces, and a predetermined hologram pattern so that the at least one of the division surfaces generates positive astigmatism and the other division surface generates negative astigmatism.

3. The optical module of claim 1, wherein the main photodetector includes:
 a first light receiving portion divided into at least two parts in a direction corresponding to a radial direction of the recording medium;
 a second light receiving portion including six sections arranged in a 2×3 matrix structure; and
 a third light receiving portion divided into at least two parts in a direction corresponding to the radial direction of the recording medium.

4. The optical module of claim 1, wherein the optical path changer includes: a polarization beam splitter that transmits or reflects incident light according to a polarization component of the light; and
 a quarter wave plate that changes the polarization of the incident light.

5. The optical module of claim 4, wherein the hologram element and the quarter wave plate are coupled to the polarization beam splitter.

6. The optical module of claim 1, wherein the light source is a semiconductor laser that emits light in one or more wavelength regions including an infrared wavelength suitable for a compact disc, a red wavelength suitable for a digital versatile disc, and a blue wavelength suitable for a next-generation digital versatile disc that is able to store moving picture information of high definition.

7. The optical module of claim 1, further comprising:
 a monitoring photodetector disposed in the body that monitors the light output emitted by the light source.

8. An optical pickup comprising:
 an optical module comprising a light source, an optical path changer that changes a path of light emitted from the light source, a main photodetector that receives light that is reflected off a recording medium back to the optical moduie to detect an information signal and/or an error signal, and a hologram element that generates astigmatism of the light incident onto the optical module; and
 an objective lens that focuses the light emitted from the optical module as an optical spot on a recording surface of the recording medium,
 wherein the main photodetector includes a first light receiving portion divided into at least two parts in a direction corresponding to a radial direction of the recording medium, a second light receiving portion including six sections arranged in a 2×3 matrix structure, and a third light receiving portion divided into at least two parts in a direction corresponding to the radial direction of the recording medium, and
 the six sections of the second light receiving portion arranged in the 2×3 matrix structure are A1, A2, A3, B1, B2 and B3, and the third light receiving portion detects a first light receiving signal and a second light receiving signal in the direction corresponding to the radial direction of the recording medium, and a tracking error signal is obtained by subtraction between a difference between a sum of signals detected by A1, A2, and A3 and a sum of signals detected by B1, B2, and B3 and the difference between the first and second light receiving signals.

9. The optical pickup of claim 8, wherein the hologram element includes at least two division surfaces, and a predetermined hologram pattern so that one of the division surfaces generates positive astigmatism and the other division surface generates negative astigmatism.

10. The optical pickup of claim 8, wherein when the first light receiving portion detects a first light receiving signal and a second light receiving signal in the direction corresponding to the radial direction of the recording medium, and an information signal is obtained by adding the first and second light receiving signals, and a relative tilt signal of the objective lens with respect to the recording medium is obtained by subtracting the first and second light receiving signals.

11. The optical pickup of claim 8, wherein a focus error signal is a difference between signals detected by the sections A2 and B2.

12. The optical pickup of claim 8, wherein the optical path changer includes:
- a polarization beam splitter that transmits or reflects incident light according to a polarization component of the light; and
- a quarter wave plate that changes the polarization of the incident light.

13. The optical pickup of claim 12, wherein the hologram element and the quarter wave plate are coupled to the polarization beam splitter.

14. The optical pickup of claim 8, wherein the light source is a semiconductor laser that emits light in one or more wavelength regions including an infrared wavelength suitable for a compact disc, a red wavelength suitable for a digital versatile disc, and a blue wavelength suitable for a next-generation digital versatile disc that is able to store moving picture information of high definition.

15. The optical pickup of claim 8, further comprising:
- a monitoring photodetector that monitors the light emitted by the light source.

16. The optical pickup of claim 8, further comprising:
- a beam shaping window that shapes the light emitted from the light source.

17. The optical pickup of claim 8, further comprising a collimating lens that collimates the light emitted from the light source into parallel light.

18. An optical pickup reading and/or writing to a recording medium, comprising:
- an optical module housing defining an optical component space, the optical component space comprising a light source emitting light, an optical path changing unit for changing a path of the emitted light to and a reflection signal from the recording medium, and a photodetector detecting the reflection signals received from the optical path changing unit to detect an information signal and/or error signals,
- wherein the optical module housing comprises a cap defining an aperture, a transparent surface disposed to cover the aperture such that the path of the emitted light passes through the transparent surface, and a body connected with the cap,
- the transparent surface is a beam shaping transparent surface which shapes the emitted light, and
- the beam shaping transparent surface is a prism having a first surface disposed perpendicular to the emitted light and a second surface inclined at an angle to an optical axis of the emitted light such that the emitted light is refracted.

19. The optical pickup of claim 18, further comprising:
- a hologram element disposed in the optical module housing to generate astigmatism to the reflection signals.

20. The optical pickup of claim 19, wherein the optical path changing means comprises:
- a polarization beam splitter to reflect light having a first linear polarization component, and to transmit light having a second linear polarization component; and
- a quarter wave plate to change a polarization of the emitted light and the reflection signals, wherein the hologram element and the quarter wave plate are in contact with the polarization beam splitter.

21. The optical pickup of claim 20, further comprising a monitoring photodetector which monitors an output level of the emitted light.

22. The optical pickup of claim 20, further comprising:
- an objective lens disposed outside the optical module housing such that the emitted light is focused on a surface of the recording medium.

23. The optical pickup of claim 22, wherein the error signals comprise at least one of a focus error signal, a tracking error signal, a tilt signal and a shift signal.

24. The optical pickup of claim 23, wherein the objective lens is adjustable in response to the shift signal.

25. The optical pickup of claim 22, wherein the photodetector comprises a main photodetector detecting a 0th order reflection signal reflected by the recording medium;
- a first and second sub photodetector detecting a +1st order reflection signal reflected by the recording medium; and
- a third and fourth sub photodetector detecting a −1st order reflection signal reflected by the optical disc.

26. A recording and/or reproducing apparatus, comprising: the optical pickup of claim 22.

27. The optical pickup of claim 18, wherein a cross section shape of the emitted light from the beam shaping transparent surface is circular.

28. The optical pickup of claim 18, wherein the light source comprises a plurality of light sources each emitting light of different wavelengths according to a type of the recording medium.

29. The optical pickup of claim 18, wherein the light source is a three wavelength semiconductor laser emitting light of one of three different wavelengths according to a type of the recording medium.

30. The optical pickup of claim 18, wherein the light source is a two wavelength twin laser diode emitting light of two different wavelengths according to a type of the recording medium.

* * * * *

UNITED STATES PATENT AND TRADEMARK OFFICE
CERTIFICATE OF CORRECTION

PATENT NO. : 7,426,172 B2  Page 1 of 1
APPLICATION NO. : 10/834998
DATED : September 16, 2008
INVENTOR(S) : Bong-gi Kim et al.

It is certified that error appears in the above-identified patent and that said Letters Patent is hereby corrected as shown below:

Column 12, Lines 15-17, after "includes:" delete "a polarization beam splitter that transmits or reflects incident light according to a polarization component of the light; and" and insert the same below "includes:".

Column 12, Line 38, change "moduie" to --module--.

Column 14, Line 31, change "comprises" to --comprises:--.

Column 14, Lines 31-32, after "comprises" delete "a main photodetector detecting a 0th order reflection signal reflected by the recording medium;" and insert the same below "comprises".

Signed and Sealed this

Twenty-second Day of September, 2009

David J. Kappos
*Director of the United States Patent and Trademark Office*